(12) United States Patent
Huh et al.

(10) Patent No.: US 9,726,799 B2
(45) Date of Patent: Aug. 8, 2017

(54) METHOD OF MANUFACTURING DOUBLE-SIDED POLARIZING PLATE AND DOUBLE-SIDED POLARIZING PLATE MANUFACTURED USING THE SAME

(71) Applicant: LG CHEM, LTD., Seoul (KR)

(72) Inventors: Eun-Soo Huh, Daejeon (KR); Eun-Mi Seo, Daejeon (KR); Kwang-Seung Park, Daejeon (KR); Mi-Rin Lee, Daejeon (KR); Yong-Il Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/364,544

(22) PCT Filed: Mar. 28, 2014

(86) PCT No.: PCT/KR2014/002644
§ 371 (c)(1),
(2) Date: Jun. 11, 2014

(87) PCT Pub. No.: WO2014/157976
PCT Pub. Date: Oct. 2, 2014

(65) Prior Publication Data
US 2015/0260893 A1    Sep. 17, 2015

(30) Foreign Application Priority Data

Mar. 28, 2013  (KR) .................. 10-2013-0033789
Mar. 27, 2014  (KR) .................. 10-2014-0035678

(51) Int. Cl.
| | |
|---|---|
| *G02B 5/30* | (2006.01) |
| *G02B 27/28* | (2006.01) |
| *B32B 37/06* | (2006.01) |
| *B32B 37/12* | (2006.01) |
| *G02B 1/12* | (2006.01) |
| *B32B 38/00* | (2006.01) |

(52) U.S. Cl.
CPC .............. *G02B 5/305* (2013.01); *B32B 37/06* (2013.01); *B32B 37/12* (2013.01); *G02B 1/12* (2013.01); *G02B 5/3025* (2013.01); *B32B 38/0008* (2013.01); *B32B 2037/1253* (2013.01); *B32B 2307/42* (2013.01); *B32B 2309/02* (2013.01); *B32B 2310/0831* (2013.01); *B32B 2363/00* (2013.01); *B32B 2383/00* (2013.01)

(58) Field of Classification Search
CPC ........ C09J 2463/00; C09J 163/00; C09J 4/00; G02B 5/3033; G02B 5/305; G02B 1/08; G02B 27/26; G02B 5/30; G02B 27/28; B32B 2310/0831; B32B 2037/1253; B32B 2307/42; B32B 37/1284; B32B 2363/00; B32B 2457/20; B32B 2551/00; G02F 1/133528; B29C 2035/082; B29C 65/48; B29C 65/4835; B29C 65/4845; B29C 65/485; B29C 65/4865
See application file for complete search history.

(56) References Cited

U.S. PATENT DOCUMENTS

| | | | |
|---|---|---|---|
| 2003/0004278 A1 | 1/2003 | Asano et al. | |
| 2004/0094264 A1* | 5/2004 | Yamaguchi | ............... B32B 7/12 156/273.3 |
| 2009/0005494 A1* | 1/2009 | Luo | ........................ C04B 41/009 524/502 |
| 2009/0257017 A1 | 10/2009 | Kitamura et al. | |
| 2009/0275718 A1 | 11/2009 | Um et al. | |
| 2010/0118399 A1 | 5/2010 | Umemoto et al. | |
| 2010/0296030 A1 | 11/2010 | Shimizu et al. | |
| 2010/0327493 A1* | 12/2010 | Fong | ..................... C07C 381/12 264/401 |
| 2012/0257129 A1* | 10/2012 | Seo | ..................... G02B 27/2214 349/15 |
| 2014/0160406 A1 | 6/2014 | Huh et al. | |
| 2014/0302328 A1 | 10/2014 | Cho et al. | |

FOREIGN PATENT DOCUMENTS

| | | |
|---|---|---|
| CN | 102778717 A | 11/2012 |
| JP | 2000230016 A | 8/2000 |
| JP | 2001151814 | 6/2001 |
| JP | 2002120326 | 4/2002 |
| JP | 2002-226822 A | 8/2002 |
| JP | 2012-234112 A | 11/2012 |
| JP | 2013047844 | 3/2013 |
| JP | 2013054237 | 3/2013 |
| KR | 1020090115040 | 11/2009 |
| KR | 10-2010-0100695 A | 9/2010 |
| KR | 10-1072371 B1 | 10/2011 |
| KR | 10-2012-0030937 A | 3/2012 |

(Continued)

*Primary Examiner* — Scott J Sugarman
*Assistant Examiner* — Balram Parbadia
(74) *Attorney, Agent, or Firm* — Dentons US LLP

(57) ABSTRACT

A method of manufacturing a double-sided polarizing plate and a double-cited polarizing plate manufactured using the same are disclosed. The method of manufacturing a double-sided polarizing plate including attaching transparent films to both surfaces of a polarizer via adhesive layers; irradiating the adhesive layers with active energy rays in an amount of light of 200 mJ/cm$^2$ or more through an energy source located in a single direction, based on the polarizer; and thermally treating a surface of the transparent film provided to oppose the energy source at a temperature of from 10° C. to 25° C.

13 Claims, No Drawings

(56) References Cited

FOREIGN PATENT DOCUMENTS

| KR | 10-2012-0071912 A | | 7/2012 | |
|----|-------------------|---|--------|---|
| KR | 20120125957 A | * | 11/2012 | ............... G02B 5/30 |
| KR | 1020120125957 A | | 11/2012 | |
| KR | 1020130020616 | | 2/2013 | |
| TW | 201231598 A1 | | 8/2012 | |

* cited by examiner

METHOD OF MANUFACTURING DOUBLE-SIDED POLARIZING PLATE AND DOUBLE-SIDED POLARIZING PLATE MANUFACTURED USING THE SAME

This application is a National Stage Entry of International Application No. PCT/KR2014/002644, filed Mar. 28, 2014 and claims the benefit of Korean Application No. 10-2013-0033789 filed on Mar. 28, 2013, and Korean Application No. 10-2014-0035678, filed Mar. 27, 2014, all of which are hereby incorporated by reference in their entirety for all purposes as if fully set forth herein.

TECHNICAL FIELD

The present invention relates to a method of manufacturing a double-sided polarizing plate and a double-sided polarizing plate manufactured using the same.

BACKGROUND ART

A polarizing plate is an apparatus configured to convert natural light into polarized light having a certain vibration direction. In recent years, polarizing plates have been applied to various display devices such as Liquid Crystal Display (LCD) devices, Organic Light Emitting Diode (OLED) devices, and the like.

Such a polarizing plate is generally used in a structure in which a protective film is attached to one or both surfaces of a polarizer via an adhesive, wherein the polarizer is formed using a polyvinyl alcohol (PVA)-based resin stained with a dichroic dye or iodine. According to the related art, triacetyl cellulose (TAC)-based films have been widely used as protective films configured to protect such a polarizing plate. However, such TAC films have problems in that such films may be easily deformed under conditions of high temperature and high humidity. Therefore, protective films formed using various materials, able to be substituted for such TAC films, are currently in development. For example, alternative methods of forming such protective films using polyethylene terephthalate (PET), cycloolefin polymer (COP), acrylic film, and the like, alone or in combination, have been proposed.

Meanwhile, an aqueous adhesive composed of an aqueous solution of a polyvinyl alcohol-based resin has been generally used as an adhesive with which to attach such a protective film to a polarizer.

However, such an aqueous adhesive may have a problem in that the use thereof is limited according to a material of a film, since this aqueous adhesive has weak adhesive strength when an acrylic film or a COP film is used instead of using the TAC film as the protective film. Also, this aqueous adhesive has problems in that when the protective films applied to both surfaces of a PVA element are formed using different materials, curling may occur in edge portions of the polarizing plate in a process of drying the aqueous adhesive, and initial optical properties may be deteriorated in addition to poor adhesive strength resulting from different types of materials being used in films. Accordingly, a non-aqueous photocurable adhesive was proposed as an alternative to solve the above-listed problems.

However, in the case of the related art, when such a non-aqueous photocurable adhesive is applied to a double-sided polarizing plate in which protective films are attached to both surfaces of the polarizer, adhesive layers formed on both surfaces of the polarizer should be respectively cured, leading to difficulties in processes in which a light irradiation process needs to be performed twice.

Meanwhile, to simplify a manufacturing process, when the adhesive layers formed on both surfaces of the polarizer are cured through a single light irradiation process, degrees of curing of the adhesive layers may be different, due to a difference in amounts of light reaching a light-irradiated surface and a non-light irradiated surface, resulting in deteriorated adhesive strength and peel strength of the non-light irradiated surface. When the adhesive strength of the adhesive layers is deteriorated, durability of the polarizing plate may be degraded, leading to deteriorations in optical physical properties and reworkability.

DISCLOSURE

Technical Problem

The present invention relates to a method of manufacturing a double-sided polarizing plate having excellent adhesive strength and peel strength in adhesive layers on both surfaces of a polarizer through a single irradiation of active energy rays by irradiating a specific amount of light or more in a single direction, based on a polarizer, and performing processing thereon at 10° C. to 25° C. in another direction thereof, and a double-sided polarizing plate manufactured using the same.

Technical Solution

According to some embodiments of the present invention, a method of manufacturing a double-sided polarizing plate may include: forming a transparent film on both surfaces of a polarizer via adhesive layers; irradiating the adhesive layers with active energy rays (light), in an amount of 200 mJ/cm$^2$ or more, through an energy source located in a single direction, based on the polarizer; and thermally treating a surface of the transparent film disposed to oppose the energy source at 10° C. to 25° C.

Peel strength of the adhesive layer formed on the transparent film at which the energy source is located may be equal to or greater than 3N at a peel angle of 90°.

The irradiating of the active energy rays and the thermally treating at 10° C. to 25° C. may be performed simultaneously with each other.

The thermally treating at 10° C. to 25° C. may be performed using a drum.

The method may further include simultaneously curing the adhesive layers formed on both surfaces of the polarizer by performing a single irradiation of the active energy rays. The adhesive layer formed on the transparent film at which the energy source is disposed may have a thickness of from 0.1 μm to 10 μm. The adhesive layer formed on a surface of the transparent film opposite to a position of the transparent film in which the energy source is located, may have a thickness of from 0.1 μm to 3 μm.

According to some embodiments of the present invention, a double-sided polarizing plate manufactured using the manufacturing method described above, may be characterized in that a difference in peel strengths of respective adhesive layers formed on both surfaces of a polarizer is equal to or less than 0.7 N.

Advantageous Effects

In the case of manufacturing a polarizing plate through the method of manufacturing a double-sided polarizing plate according to an exemplary embodiment of the present invention, a non-light irradiated surface may be processed at 10° C. to 25° C., simultaneously with an irradiation of active energy rays in an amount of light of 200 mJ/cm$^2$ or more, so as to improve a curing speed on the non-light irradiated surface, such that adhesive layers having excellent adhesive strength may be simultaneously formed on both surfaces of the polarizer through a single irradiation of active energy rays, whereby a manufacturing process may be simplified.

A double-sided polarizing plate according to an exemplary embodiment of the present invention, manufactured through the method of the present invention, may have excellent reworkability as well as having excellent peel strength between a polarizer and a transparent film and external appearance characteristics.

BEST MODE

Exemplary embodiments of the present invention will now be described in detail with reference to the accompanying drawings. The invention may, however, be exemplified in many different forms and should not be construed as being limited to the specific embodiments set forth herein. Rather, these embodiments are provided so that this invention will be thorough and complete, and will fully convey the scope of the invention to those skilled in the art. In the drawings, the shapes and dimensions of elements may be exaggerated for clarity, and the same reference numerals will be used throughout to designate the same or like elements.

In the case of a method of manufacturing a double-sided polarizing plate according to the related art, when adhesive layers are only irradiated with light once, the adhesive layer arranged in a direction of light irradiation may have a sufficient degree of adhesive strength, while the adhesive layer arranged in a direction of non-light irradiation may have a relatively low curing rate since only approximately 20% of available light reaches the adhesive layer, resulting in deteriorated adhesive strength. Therefore, to obtain sufficient adhesive strength in the adhesive layer formed on the non-light irradiated surface, the adhesive layers formed on both surfaces of the polarizer should be separately cured by the irradiation of light thereonto. In this case, a manufacturing process may be somewhat complex.

However, the present inventors conducted research, and surprisingly, found that when a surface of a film, not irradiated with active energy rays, is thermally treated at a temperature within a specific range, simultaneously with irradiation using the active energy rays in a specific amount of light or more, a curing degree of the adhesive layer formed on the non-light irradiated surface may be improved, and thus, relatively excellent adhesive strength may be ensured in both adhesive layers formed on both surfaces of the polarizer by a single irradiation of light.

In further detail, according to an exemplary embodiment of the present invention, a method of manufacturing a double-sided polarizing plate may include 1) attaching transparent films to both surfaces of a polarizer via adhesive layers, 2) irradiating the adhesive layers with active energy rays (light), in an amount of 200 mJ/cm$^2$ or more, emitted by an energy source disposed in a single direction, based on the polarizer, and 3) thermally treating a surface of the transparent film disposed to oppose the energy source at a temperature of from 10° C. to 25° C.

In this specification, the term "double-sided polarizing plate" refers to a polarizing plate having a structure in which protective films are attached to both surfaces of the polarizer, and is distinct from a single-sided polarizing plate in which a protective film is only attached to one surface of the polarizer.

Hereinafter, respective operations of the method of manufacturing a double-sided polarizing plate according to an exemplary embodiment of the present invention will be described in detail.

First, transparent films are attached to both surfaces of a polarizer via adhesive layers.

In this case, the polarizer is not particularly limited. For example, polarizers commonly known in the art, for example, a film formed using polyvinyl alcohol (PVA) including iodine or a dichroic dye may be used. The polarizer may be manufactured by staining a PVA film with iodine or dichroic dye, but a method of manufacturing the polarizer is not particularly limited. In this specification, the term "polarizer" refers to a plate not including a protective film, while the term "polarizing plate" refers to a plate including a polarizer and a protective film.

Meanwhile, the adhesive layer may be formed using an active energy ray-curable adhesive, and in detail, may be formed using a cationic adhesive. Here, the cationic adhesive refers to an adhesive including a compound, cured through a cationic polymerization reaction, as a main ingredient.

For example, the cationic adhesive may include (1) 5 to 90 parts by weight of an epoxy compound having at least two epoxy groups in a molecule; (2) 5 to 90 parts by weight of an oxetane compound having at least one oxetanyl group in the molecule; and (3) 0.5 to 20 parts by weight of an optical cationic photopolymerization initiator.

A type of the epoxy compound (1) is not particularly limited as long as it has at least two epoxy groups in the molecule. For example, epoxy resins commonly known in the art, such as an aromatic epoxy, an alicyclic epoxy or an aliphatic epoxy may be used alone or in combination.

In this case, the aromatic epoxy refers to an epoxy having an aromatic group in the molecule. For example, bisphenol-type epoxy resins such as a bisphenol A-based epoxy, a bisphenol F-based epoxy, a bisphenol S-based epoxy, and a brominated bisphenol-based epoxy; a novolac-type epoxy resin such as a phenol novolac-type epoxy resin or a cresol novolac-type epoxy resin; cresol epoxy; resorcinol glycidyl ether, and the like may be used as the aromatic epoxy.

Meanwhile, the alicyclic epoxy refers to a compound in which an epoxy group is formed between two adjacent carbon atoms constituting an aliphatic ring. For example, dicyclopentadiene dioxide, limonene dioxide, 4-vinylcyclohexene dioxide, 2,4-epoxycyclohexylmethyl 3,4-epoxycyclohexanecarboxylate, dicyclopentadiene dioxide, or bis(3,4-epoxycyclohexylmethyl)adipate may be used as the alicyclic epoxy.

Further, a polyglycidyl ether of aliphatic polyhydric alcohol; a polyglycidyl ether of alkylene oxide addition product with aliphatic polyhydric alcohol, or the like may be used as the aliphatic epoxy.

In this case, examples of the aliphatic polyhydric alcohol that may be used herein may, for example, include aliphatic polyhydric alcohols having a carbon number range of from 2 to 20. In further detail, the aliphatic polyhydric alcohol may be, for example, one or more selected from the group consisting of aliphatic diols such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7- heptanediol, 3,5-heptanediol, 1,8-octanediol, 2-methyl-1,8-octanediol, 1,9-nonanediol, and 1,10-decanediol; alicyclic diols such as cyclohexanedimethanol, cyclohexanediol, hydrogenated bisphenol A, and hydrogenated bisphenol F; trivalent polyols such as trimethylolethane, trimethylolpropane, hexitols, pentitols, glycerine, polyglycerine, pentaerythritol, dipentaerythritol, tetramethylolpropane, and the like.

In addition, as the alkylene oxide, for example, ethyleneoxide, propyleneoxide, butyleneoxide, or the like, may be used.

Meanwhile, according to an exemplary embodiment of the present invention, a combination of a first epoxy compound containing an epoxidized aliphatic group, for example, one or more alicyclic epoxy rings, and a second epoxy compound containing one or more glycidyl ether groups, may be used as the epoxy compound, but the present invention is not limited thereto.

When such a combination of the first epoxy compound and the second epoxy compound is used, an adhesive for a polarizing plate having improved thermal shock properties may be manufactured. In this case, the first epoxy compound and the second epoxy compound may be mixed at a weight ratio of 1:1 to 3:1, and in further detail, a weight ratio of 1:1 to 2:1. In further detail, the first epoxy compound and the second epoxy compound may be mixed at a weight ratio of 1:1. In further detail, when the weight ratio of the first epoxy compound to the second epoxy compound satisfies this weight ratio range, the physical properties may be achieved in aspects of glass transition temperature, adhesive strength and viscosity. According to the exemplary embodiment of the present invention, the first epoxy and second epoxy compounds may be, for example, included in a content of 20 to 60 parts by weight, based on a total of 100 parts by weight of the adhesive composition. The first epoxy compound may be, for example, at least one selected from the group consisting of 3,4-epoxycyclohexylmethyl-3,4'-epoxycyclohexanecarboxylate, bis(3,4-epoxy cyclohexylmethyl)adipate dicyclopentadiene dioxide, limonene dioxide, and 4-vinylcyclohexene dioxide. The first epoxy compound serves to increase Tg and provide the adhesive layer with hardness. In further detail, the first epoxy compound may be 3,4-epoxycyclohexylmethyl-3,4'-epoxycyclohexanecarboxylate.

Types of the second epoxy compound are not particularly limited as long as they contain one or more glycidyl ether groups. For example, the second epoxy compound may be one or more selected from the group consisting of 1,4-cyclohexanedimethanol diglycidyl ether, novolac epoxy, bisphenol A-based epoxy, bisphenol F-based epoxy, brominated bisphenol-based epoxy, 1,6-hexanedioldiglycidyl ether, trimethylolpropanetriglycidyl ether, n-butyl glycidyl ether, aliphatic glycidyl ether ($C_{12}$-$C_{14}$), 2-ethylhexyl glycidyl ether, phenyl glycidyl ether, o-cresyl glycidyl ether, and nonyl phenyl glycidyl ether. The second epoxy compound serves to provide softness in order to enhance adhesive strength. In this case, the second epoxy compound may be an epoxy compound containing, in further detail, an aliphatic ring, and in more detail, 1,4-cyclohexanedimethanol diglycidyl ether.

Next, types of the oxetane compound (2) are not particularly limited as long as they have at least one oxetanyl group in the molecule. For example, various oxetane compounds commonly known in the art may be used as the oxetane compound. The oxetane compound according to an exemplary embodiment of the present invention may, for example, include 3-ethyl-3-[(3-ethyloxetan-3-yl)methoxymethyl]oxetane, 1,4-bis[(3-ethyloxetan-3-yl)methoxymethyl]benzene, 1,4-bis[(3-ethyloxetan-3-yl)methoxy]benzene, 1,3-bis[(3-ethyloxetan-3-yl)methoxy]benzene, 1,2-bis[(3-ethyloxetan-3-yl)methoxy]benzene, 4,4'-bis[(3-ethyloxetan-3-yl)methoxy]biphenyl, 2,2'-bis[(3-ethyloxetan-3-yl)methoxy]biphenyl, 3,3',5,5'-tetramethyl-4,4'-bis[(3-ethyloxetan-3-yl)methoxy]biphenyl, 2,7-bis[(3-ethyloxetan-3-yl)methoxy]naphthalene, bis[4-{(3-ethyloxetan-3-yl)methoxy}phenyl]methane, bis[2-{(3-ethyloxetan-3-yl)methoxy}phenyl]methane, 2,2-bis[4-{(3-ethyloxetan-3-yl)methoxy}phenyl]propane, an etherified modification product of a novolac-type phenol-formaldehyde resin by 3-chloromethyl-3-ethyloxetane, 3(4),8(9)-bis[(3-ethyloxetan-3-yl)methoxymethyl]-tricyclo[5.2.1.02,6]decane, 2,3-bis[(3-ethyloxetan-3-yl)methoxymethyl]norbornane, 1,1,1-tris[(3-ethyloxetan-3-yl)methoxymethyl]propane, 1-butoxy-2,2-bis[(3-ethyloxetan-3-yl)methoxymethyl]butane, 1,2-bis[{2-(3-ethyloxetan-3-yl)methoxy}ethylthio]ethane, bis[{4-(3-ethyloxetan-3-yl)methylthio}phenyl]sulfide, 1,6-bis[(3-ethyloxetan-3-yl)methoxy]-2,2,3,3,4,4,5,5-octafluorohexane, and the like. Meanwhile, the content of the oxetane compound may be in a range of approximately 5 to 90 parts by weight, and in further detail, approximately 10 to 90 parts by weight.

Subsequently, the cationic photopolymerization initiator (3) refers to a compound forming cation species or Lewis acid by irradiation of active energy rays. For example, the cationic photopolymerization initiator may include an onium salt such as an aromatic diazonium salt, an aromatic iodine aluminum salt or an aromatic sulfonium salt, iron-arene complex, and the like, but the present invention is not limited thereto. Meanwhile, the content of the cationic photopolymerization initiator is in a range of approximately 0.5 to 20 parts by weight, in detail, approximately 0.5 to 15 parts by weight, and in more detail, approximately 0.5 to 10 parts by weight, based on a total of 100 parts by weight of the adhesive composition.

On the other hand, the cationic adhesive composition may further contain a vinyl-based compound together with the above-mentioned components as needed. When the vinyl-based compound is added, relatively low viscosity may be maintained, and the occurrence of a phenomenon in which a glass transition temperature of the adhesive layer is lowered after curing may be decreased.

As the vinyl-based compound, for example, hydroxyl $C_{1-6}$ alkylvinylether and/or vinyl acetate may be used. Here, the hydroxy $C_{1-6}$ alkylvinylether may be at least one selected from the group consisting of hydroxyl ethylvinylether, hydroxyl butylvinylether, 1,4-cyclohexanedimethanol vinylether, 4-(hydroxymethyl)cyclohexylmethyl vinylether, ethylene glycolvinylether, and diethylene glycol monovinylether. Meanwhile, the vinyl-based compound may be included in a content of 0.1 parts by weight to 10 parts by weight, or 0.1 parts by weight to 5 parts by weight, based on a total of 100 parts by weight of the adhesive composition.

In addition to the components, the cationic adhesive composition according to an exemplary embodiment of the present invention may also, further include a silane coupling agent, as necessary. When the silane coupling agent is included, the silane coupling agent may function to reduce the surface energy of an adhesive, thereby improving wettability of the adhesive.

In further detail, in this case, the silane coupling agent may include a cationic polymerizable functional group such as an epoxy group, a vinyl group, or a radical group. The present inventors have found that wettability may be improved without causing a decrease in a glass transition temperature of the adhesive when the silane coupling agent containing the cationic polymerizable functional group is used, compared to the case in which a silane coupling agent not containing the cationic polymerizable functional group or a surfactant is used. For example, cross-linking may occur while the cationic polymerizable functional group of the silane coupling agent reacts with a silane group of the adhesive composition, thereby resulting in a decrease in glass transition temperature of the adhesive layer after curing.

The silane coupling agent used in the present invention may, for example, be a silane coupling agent represented by the following Formula 1, but the present invention is not limited thereto.

$$Si(R_1)_n(R_2)_{4-n} \quad \text{[Formula 1]}$$

In Formula 1, $R_1$ represents a cationic polymerizable functional group bound to a silicon atom, for example, a functional group containing a cyclic ether group or vinyloxy group, $R_2$ represents hydrogen, a hydroxyl group, an alkyl group, or an alkoxy group, bound to a silicon atom, and n is an integer ranging from 1 to 4.

Detailed examples of the silane coupling agent satisfying Formula 1 may include 2-(3,4-epoxycyclohexyl) ethyl trimethoxy silane, 3-glycidoxypropyl trimethoxy silane, glycidoxypropyl methyldiethoxy silane, glycidoxypropyl tri-ethoxy, vinyltrimethoxysilane, vinyltriethoxysilane, or the like, but the present invention is not limited thereto.

In addition, an oligomer-type silane compound in which the above-described cationic polymerizable functional group is introduced into the molecule of a siloxane oligomer may also be used as the silane coupling agent usable in the present invention. In this case, the siloxane oligomer may be a silicone resin having a relatively low molecular weight, in which the end of a molecular chain is blocked with an alkoxysilyl group.

In this case, the cationic adhesive composition may include the silane compound in a content of 0.1 parts by weight to 10 parts by weight, or 0.1 parts by weight to 5 parts by weight, based on a total of 100 parts by weight of the adhesive composition. Within this content range, surface energy and adhesiveness of the adhesive layer appropriate therefor may be expressed.

On the other hand, the cationic adhesive composition according to an exemplary embodiment of the present invention may further include a radical polymerizable monomer, as necessary. Compounds containing a radical-reactive functional group may be used as the radical polymerizable monomer without particular limitation. For example, (meth)acrylate, (meth)acrylamide, maleimide, (meth)acrylic acid, maleic acid, itaconic acid, (meth)acryl-aldehyde, (meth)acryloylmorpholine, N-vinyl-2-pyrrolidone, triallyl isocyanurate, containing one or more (meth) acryloyl groups in the molecule thereof, may be used as the radical polymerizable monomer.

In this case, detailed examples of the (meth)acrylate having one (meth)acryloyl group in the molecule may include methyl (meth)acrylate, ethyl (meth)acrylate, propyl (meth)acrylate, isopropyl (meth)acrylate, butyl (meth)acrylate, isobutyl (meth)acrylate, 2-ethylhexyl (meth)acrylate, octyl (meth)acrylate, isooctyl (meth)acrylate, lauryl (meth) acrylate, stearyl (meth)acrylate, 2-hydroxyethyl (meth)acrylate, 2-hydroxypropyl (meth)acrylate, 4-hydroxybutyl (meth)acrylate, cyclohexyl (meth)acrylate, isobornyl (meth) acrylate, 1,4-cyclohexanedimethylol mono(meth)acrylate, dicyclopentanyl (meth)acrylate, dicyclopentenyl (meth) acrylate, dicyclopentenyloxyethyl (meth)acrylate, benzyl (meth)acrylate, (meth)acrylate of a phenolalkylene oxide addition product, a (meth)acrylate of a p-cumylphenolalkylene oxide addition product, a (meth)acrylate of an o-phenylphenolalkylene oxide addition product, a (meth)acrylate of a nonylphenolalkylene oxide addition product, 2-methoxyethyl (meth)acrylate, ethoxyethoxyethyl (meth) acrylate, a(meth)acrylate of an alkylene oxide addition product with 2-ethylhexylalcohol, ethylene glycol mono(meth) acrylate, propyleneglycol mono(meth)acrylate, pentanediol mono(meth)acrylate, hexanediol mono(meth)acrylate, a mono(meth)acrylate of diethylene glycol, a mono(meth) acrylate of triethylene glycol, a mono(meth)acrylate of tetraethylene glycol, a mono(meth)acrylate of polyethylene glycol, a mono(meth)acrylate of dipropyleneglycol, a mono (meth)acrylate of tripropyleneglycol, a mono(meth)acrylate of polypropyleneglycol, 2-hydroxy-3-phenoxypropyl (meth)acrylate, 2-hydroxy-3-butoxypropyl (meth)acrylate, tetrahyrdo furfuryl (meth)acrylate, caprolactone-modified tetrahyrdo furfuryl (meth)acrylate, 2-ethyl-2-methyl-1,3-dioxolan-4-yl)methyl (meth)acrylate, (2-isobutyl-2-methyl-1,3-dioxolan-4-yl)methyl (meth)acrylate, (1,4-dioxaspiro[4,5] decan-2-yl)methyl (meth)acrylate, glycidyl (meth)acrylate, 3,4-epoxycyclohexylmethyl (meth)acrylate, (3-ethyloxetan-3-yl)methyl (meth)acrylate, 2-(meth)acryloyloxymethyliso-cyanate, allyl (meth)acrylate, N-(meth) acryloyloxyethylhexahydrophthalimide, N-(meth)acryloy-loxyethyltetrahydrophthalimide, 2-(meth)acryloyloxyethyl-hexahydrophthalic acid, 2-(meth)acryloyloxyethylsuccinic acid, ω-carboxy-polycaprolactonemono(meth)acrylate, or 2-(meth)acryloyloxyethyl acid phosphate.

Further, detailed examples of the (meth)acrylamide may include (meth)acrylamide, N,N-dimethyl (meth)acrylamide, N,N-diethyl (meth)acrylamide, N-methylol (meth)acrylamide, N-(3-N,N-dimethylaminopropyl)(meth)acrylamide, methylenebis(meth)acrylamide, ethylenebis(meth)acrylamide, N,N-diallyl (meth)acrylamide, or the like.

In addition, detailed examples of the maleimide may include N-methylmaleimide, N-hydroxyethylmaleimide, N-hydroxyethylcitraconimide, N-hydroxyethylcitraconimide, or the like.

Detailed examples of the (meth)acrylate containing two (meth)acryloyl groups in the molecule may include 1,3-butanediol di(meth)acrylate, 1,6-hexanediol di(meth)acrylate, 1,9-nonanediol di(meth)acrylate, 1,10-decanediol di(meth)acrylate, 1,3-butyleneglycol di(meth)acrylate, 2-methacryloyloxyethyl acid phosphate, ethylene glycol di(meth)acrylate, diethylene glycol di(meth)acrylate, triethylene glycol di(meth)acrylate, neopentyl glycol di(meth) acrylate, dipropyleneglycol di(meth)acrylate, tripropyleneglycol di(meth)acrylate, tetraethylene glycol di(meth) acrylate, cyclohexanedimethanol di(meth)acrylate, polyethylene glycol di(meth)acrylate, polyethylene glycol (200) di(meth)acrylate, polyethylene glycol (400) di(meth) acrylate, polyethylene glycol (600) di(meth)acrylate, glycerine di(meth)acrylate, 2-hydroxy-3-acrylooxypropylmeth-acrylate, dimethyloltricyclodecane di(meth)acrylate, or the like.

Detailed examples of the (meth)acrylate containing three (meth)acryloyl groups in the molecule may include trimethylolpropane tri(meth)acrylate, ditrimethylolpropane tri (meth)acrylate, trimethylpropane tri(meth)acrylate, tri(2-hydroxyethyl)isocyanurate triacrylate, tri(2-hydroxyethyl) isocyanurate, pentaerythritoltriacrylate, ethoxylate trimethylolpropane tri(meth)acrylate, proxylatetrimethylol-propane tri(meth)acrylate, or the like.

Detailed examples of the (meth)acrylate containing four and/or five (meth)acryloyl groups in the molecule may include pentaerythritol tetra(meth)acrylate, ditrimethylolpropane tetra(meth)acrylate, dipentaerythritol penta(meth)acrylate, epoxylate pentaerythritoltetra(meth)acrylate, pentaacrylate ester, or the like.

Detailed examples of the (meth)acrylate containing six (meth)acryloyl groups in the molecule may include dipentaerythritol hexa(meth)acrylate, and the like.

Meanwhile, the content of the radical polymerizable monomer is in a range of approximately 0 part by weight to 40 parts by weight, in detail, approximately 5 parts by weight to 30 parts by weight, and in further detail, approximately 5 parts by weight to 25 parts by weight, based on a total of 100 parts by weight of the adhesive composition.

When the adhesive composition includes the radical polymerizable monomer, in order to induce radical polymerization properties to increase and thus improve a curing rate, the radical photopolymerization initiator may be used. As the radical photopolymerization initiator, for example, an acetophenone-based photopolymerization initiator, a benzoin ether-based photopolymerization initiator, a benzophenone-based photopolymerization initiator, a thioxanthone-based photopolymerization initiator, and the like, may be used, but the present invention is not limited thereto. The content of the radical photopolymerization initiator may be in a range of approximately 0.5 to 20 parts by weight, in detail, approximately 0.5 to 15 parts by weight, and in further detail, approximately 0.5 to 10 parts by weight, based on a total of 100 parts by weight of the adhesive composition.

The cationic adhesive composition may further include a photosensitizing agent, an antioxidant, an oligomer, and an adhesion promoter, as necessary. In this case, the cationic adhesive composition may further include urethane acrylate in an amount greater than 0 and equal to or less than 4 parts by weight. When the cationic adhesive composition further includes the urethane acrylate, viscosity tends to increase, but the increased viscosity of the adhesive may be lowered by heating. Meanwhile, when the cationic adhesive composition further includes the urethane acrylate, improved adhesive strength may be provided in using the acrylic film.

In the method of manufacturing a double-sided polarizing plate according to an exemplary embodiment of the present invention, the above-described adhesive composition used to form adhesive layers may have a viscosity of approximately 15 cP to 50 cP. When the viscosity of the adhesive composition satisfies this viscosity range, the adhesive layer having a reduced thickness may be formed, and thus may have low viscosity. As a result, the adhesive composition exhibits excellent workability.

Also, the adhesive composition may have a glass transition temperature of 90° C. or higher after curing, and thus exhibit excellent heat resistance. When the polarizing plate manufactured using the cationic curable adhesive composition is measured for heat resistance, durability and thermal impact property at 80° C., the polarizer may not be broken.

Further, when the polarizing plate manufactured using the adhesive composition is immersed in water having a temperature of 60° C. for 24 hours, the polarizer is discolored to less than 10 mm in a machine direction (i.e., an MD direction), indicating that the adhesive composition exhibits relatively excellent water resistance.

As such, since the cationic adhesive has excellent adhesive strength with respect to films of various materials, and also exhibits excellent water resistance, heat resistance, and the like, the cationic adhesive may be used to manufacture polarizing plates having excellent characteristics.

Next, the transparent film may be a compensation film configured to compensate for the optical properties of the polarizer or may be a protective film to protect a polarizer. In this case, publicly known polymer films may be used as the transparent film.

In further detail, the transparent film may be, for example, at least one selected from the group consisting of an acrylic film, a Polyethylene Terephthalate (PET) film, a PET film treated with an acrylic primer, a polynorbonene (PNB)-based film, a Cyclic Olefin Polymer (COP) film, a polycarbonate film, and TAC films such as NRT (Fuji Film Co.), N TAC (Konica), V TAC (Fuji Film Co.), UZ TAC (Fuji Film Co.), and the like, but the present invention is not limited thereto. Among these, the transparent film may be, in further detail, an acrylic film.

In the present invention, the acrylic film used as the transparent film may include a (meth)acrylate-based resin. Films including the (meth)acrylate-based resin may be obtained, for example, by molding a moldable material including the (meth)acrylate-based resin as a main ingredient through extrusion molding.

The acrylic film may be a film including a copolymer containing an alkyl (meth)acrylate-based unit and a styrene-based unit and an aromatic resin having a carbonate residue in the main chain, or may be a film including an alkyl (meth)acrylate-based unit, a styrene-based unit, a 3 to 6-membered heterocyclic unit substituted with at least one carbonyl group, and a vinyl cyanide unit.

In addition, the acrylic film may be a film including a (meth)acrylate-based resin having an aromatic ring. Examples of the (meth)acrylate-based resin having an aromatic ring may include a resin composition including (a) a (meth)acrylate-based unit containing one or more (meth)acrylate-based derivatives; (b) an aromatic unit including an aromatic residue and a chain containing a hydroxyl group-containing residue; and (c) a styrene-based unit including one or more styrene-based derivatives, as disclosed in Korean Patent Laid-open Publication No. 10-2009-0115040. The units (a) to (c) may be included in the form of separate copolymers in the resin composition, and two or more of the units (a) to (c) may be included in the form of one copolymer in the resin composition.

In addition, the acrylic film may be a film including an acrylic resin having a lactone ring structure. Detailed examples of the (meth)acrylate-based resin having a lactone ring structure may, for example, include (meth)acrylate-based resins having a lactone ring structure as disclosed in Japanese Patent Laid-open Publication Nos. 2000-230016, 2001-151814, and 2002-120326.

The method of manufacturing an acrylic film is not particularly limited. For example, a film may be formed by thoroughly mixing a (meth)acrylate-based resin and other polymers, additives, and the like, using any proper mixing method, to prepare a thermoplastic resin composition, and molding the thermoplastic resin composition, or a film may be formed by preparing separate solutions using a (meth)acrylate-based resin and other polymers, additives, and the like, and mixing the solutions to prepare a uniform mixture solution, and molding the mixture solution.

The thermoplastic resin composition may, for example, be prepared by pre-blending film materials using any suitable mixing machine such as an Omni mixer and extruding and kneading the resulting mixture. In this case, the mixing machine used for the extrusion and kneading is not particularly limited. For example, any suitable extruder such as a single-screw extruder or a double-screw extruder, or any suitable mixing machine such as a dispersion kneader may be used.

The method of molding a film may include, for example, any suitable film molding methods such as a solution casting method (i.e., a solution softening method), a melt extrusion method, a calendaring method, a compression molding method, and the like. Among these methods of molding a film, the solution casting method (a solution softening method) and the melt extrusion method may be used.

A solvent used in the solution casting method (i.e., a solution softening method) may, for example, include aromatic hydrocarbons such as benzene, toluene, xylene and the like; aliphatic hydrocarbons such as cyclohexane, decaline and the like; esters such as ethyl acetate, butyl acetate and the like; ketones such as acetone, methyl ethyl ketone, methylisobutylketone and the like; alcohols such as methanol, ethanol, isopropanol, butanol, isobutanol, methyl cellosolve, ethyl cellosolve, butyl cellosolve and the like; ethers such as tetrahydrofuran, dioxane and the like; halogenated hydrocarbons such as dichloromethane, chloroform, carbon tetrachloride and the like; dimethylformamide; dimethylsulfoxide, and the like. Here, the above-described solvents may be used alone or in a combination of two or more thereof.

An apparatus for performing the solution casting method (i.e., a solution softening method) may, for example, include a drum-type casting machine, a band-type casting machine, a spin coater, and the like. The melt extrusion method may, for example, include a T-die method, an inflation method, and the like. The molding temperature may be, in detail, in a range of 150° C. to 350° C., and in further detail, in a range of 200° C. to 300° C.

When a film is molded using the T-die method, a roll-shaped film may be obtained by installing a T-die at a leading end of a known single-screw or double-screw extruder and winding a film extruded in the form of a thin film. In this case, uniaxial elongation may be performed by adjusting the temperature of a winding roll to be appropriate therefor and elongating the film in an extrusion direction. In addition, simultaneous and sequential biaxial elongations, or the like, may also be performed by elongating the film in a direction perpendicular to the extrusion direction.

The acrylic film may be either a non-elongated film or an elongated film. In this case, the elongated film may be either a uniaxially elongated film or a biaxially elongated film, and the biaxially elongated film may be either a simultaneously biaxially elongated film or a sequentially biaxially elongated film. When the film is biaxially elongated, the performance of the film may be improved due to improved mechanical strength. On the other hand, when another thermoplastic resin is blended with the acrylic resin and elongated, an increase in a phase difference may be suppressed, and optical isotropy of the acrylic resin may be maintained.

The elongation temperature may be close to the glass transition temperature of the thermoplastic resin composition, a raw material of a film. In detail, the elongation temperature may be in a range of (a glass transition temperature of −30° C.) to (a glass transition temperature of +100° C.), and in further detail, in a range of (a glass transition temperature of −20° C.) to (a glass transition temperature of +80° C.). When the elongation temperature is lower than (a glass transition temperature of −30° C.), sufficient elongation magnification may not be obtained. On the other hand, stable elongation may not be achieved due to the flowing of the resin composition when the elongation temperature exceeds (a glass transition temperature of +100° C.).

Meanwhile, when the elongation magnification is defined as an area ratio, the elongation magnification may be in a range of approximately 1.1 to 25 times, and in further detail, in a range of approximately 1.3 to 10 times. When the elongation magnification is less than 1.1 times, improvements in toughness involved in the elongation may not be realized. When the elongation magnification exceeds 25 times, effects may not occur in an amount equal to an increase in the elongation magnification.

The elongation rate in a single direction may be in a range of 10%/min to 20,000%/min, and in further detail, in a range of 100%/min to 10,000%/min. When the elongation rate is less than 10%/min, a time required to reach sufficient elongation magnification may be lengthened, resulting in an increase in manufacturing costs. On the other hand, when the elongation rate exceeds 20,000%/min, the elongated film may be broken.

The acrylic film may be subjected to a thermal treatment (annealing) after the elongation in order to stabilize the optical isotropy or mechanical characteristics. The thermal treatment conditions are not particularly limited, and thus publicly known conditions appropriate therefor may be used.

Meanwhile, the transparent film may be subjected to a surface treatment, as necessary, in order to improve adhesive strength. For example, at least one surface of the optical film may be subjected to at least one surface treatment selected from the group consisting of alkali treatment, corona treatment, and plasma treatment.

Next, after an operation of attaching transparent films to both surfaces of the polarizer via adhesive layers is performed, the adhesive layers are irradiated with active energy rays (light), in an amount of 200 mJ/cm$^2$ or more, emitted by an energy source disposed in a single direction, based on the polarizer.

In this case, examples of the active energy rays may include particle beams such as alpha-particle beams, proton beams, or neutron beams, as well as UV rays, electron beams, microwaves, infrared rays (IR), X rays, and gamma rays. In general, UV rays or electron beams may be used.

Here, the amount of the active energy rays (light) irradiated onto the adhesive layer may be in a range of 200 mJ/cm$^2$ to 2,000 mJ/cm$^2$, 300 mJ/cm$^2$ to 1,800 mJ/cm$^2$, or 400 mJ/cm$^2$ to 1,500 mJ/cm$^2$, but the present invention is not limited thereto. When the amount of the active energy rays (light) is less than 200 mJ/cm$^2$, adhesive strength may be insufficient due to a relatively slow initial curing rate of the adhesive layer. On the other hand, when the amount of the active energy rays (light) exceeds 2,000 mJ/cm$^2$, an irradiation time may be lengthened, and an irradiation system should be further installed, resulting in an increase in production costs, and a decrease in productivity with limitations on facilities.

Meanwhile, according to the results of research conducted by the present inventors, a difference in adhesive strength is not especially high depending on a thickness in the case of adhesive layers provided in a direction of irradiation with active energy rays. However, when the adhesive layer of an irradiated surface has a relatively thick thickness, wrinkles or the like may occur on the polarizing plate, a final product. Therefore, the adhesive layer of a surface irradiated with the active energy rays may have a further reduced thickness. In the present invention, the thickness of the adhesive layer of a surface irradiated with the active energy rays may be in a range of approximately 0.1 μm to 10 μm, in detail, approximately 0.1 μm to 7 μm, and in further detail, approximately 0.1 μm to 5 μm.

Subsequently, a surface of the transparent film disposed to oppose the energy source may be thermally treated at a temperature of 10° C. to 25° C., simultaneously with the irradiation of the active energy rays. According to the research results by the present inventors, in a case in which a thermal treatment is performed in a range of from 10° C. to 25° C., the shrinkage of the adhesive layer due to heat generated at the time of curing may be significantly reduced to maintain the adhesive strength of the non-light irradiated surface at a relatively high degree.

In this case, the processing temperature may be within a range of from 10° C. to 25° C. or from 10° C. to 20° C., and in further detail, in a range of from 15° C. to 20° C. When a processing temperature on the non-light irradiated film surface is less than 10° C., dew drops may be generated on a surface of a temperature controlling apparatus for controlling of temperature, for example, with regard to the above-mentioned temperature range, and thus, water drops may also be generated on the polarizing plate surface, causing difficulties in carrying out processes. In addition, when a film surface of the non-light irradiated surface of the active energy rays is controlled to have a temperature exceeding 25° C., since a film in a transverse direction (a TD direction), instead of a process proceeding direction, may not be sufficiently close-attached due to expansion in the case of a laminated film after a lamination process, a tunneling phenomenon in which bubbles are generated may occur.

Therefore, by performing a process of processing the non-light irradiated surface at a temperature of 10° C. to 25° C. simultaneously with irradiation of the active energy rays according to an exemplary embodiment of the present invention, visual appearance defects in the polarizing plate may be reduced, and since the adhesive composition formed on both surfaces of the polarizer may be simultaneously cured, a manufacturing time may be decreased, such that an additional process does not need, thereby promoting the simplification of a process.

Meanwhile, the process in which a surface of the transparent film, disposed to oppose the energy source, is processed at a temperature within a range of 10° C. to 25° C., may be performed using, for example, a drum or the like, but is not limited thereto. In further detail, the processing at a temperature of from 10° C. to 25° C. may be performed using a method of controlling a temperature of the drum to be within the temperature range of 10° C. to 25° C. simultaneously with the irradiation of the active energy rays onto a surface of the film opposite to the film surface closely adhered to the drum.

In this regard, in a method of manufacturing a double-sided polarizing plate according to the related art, the polarizing plate is laminated without an element supporting the polarizing plate, and is then irradiated with active energy rays using a UV irradiation system while moving the polarizing plate. In this case, however, since the element to support a film is not present, wrinkles may be formed on the laminated polarizing plate in a transverse direction (i.e., a TD direction) due to curing shrinkage force. Also, when both surfaces of the polarizing plate are irradiated with active energy rays as in the related art, a relatively large amount of heat is generated from a lamp in the UV irradiation system, and reaction heat is also generated through a reaction of the adhesive irradiated with UV rays. The heat and/or reaction heat generated thereby may be used to expand and shrink the polarizing plate. In this case, undulating wrinkles may occur in the polarizing plate. Such wrinkles occurring on the polarizing plate may not be flattened, even in the case that the polarizing plate undergoes subsequent processes or the manufactured double-sided polarizing plate is adhered to a liquid crystal panel. Further, since bubbles are easily formed on an adhered surface due to such wrinkles, defective liquid crystal panels may be produced, leading to a significant decrease in productivity.

However, when a surface of a film not directly irradiated with active energy rays is closely adhered to a drum and irradiated with active energy rays according to an exemplary embodiment of the present invention, the drum may serve to support the polarizing plate, thereby decreasing curing shrinkage force applied to the polarizing plate. Accordingly, since the occurrence of wrinkles may be significantly reduced, visual appearance defects in the polarizing plate may be prevented. In addition, when the double-sided polarizing plate is adhered to a liquid crystal panel, the double-sided polarizing plate has an excellent ability to reduce the occurrence of defects in liquid crystal panels since bubbles are not formed on an adhered surface.

In detail, when a surface of a film not irradiated with active energy rays is adhered to the drum, and simultaneously, the temperature of the drum is adjusted to thermally treat the surface of the film not irradiated with active energy rays in a range of 10° C. to 25° C., since sufficient adhesive strength on the adhesive layer formed on a surface non-light irradiated with the active energy rays with respect to the polarizer may be obtained without performing an additional process, excellent adhesive strength of the double-sided polarizing plate and excellent external appearance characteristics thereof as well as a simplified process may be secured.

On the other hand, when the double-sided polarizing plate produced according to the method of manufacturing a double-sided polarizing plate according to an exemplary embodiment of the present invention is adhered to a liquid crystal panel, a region of the double-sided polarizing plate adhered to the liquid crystal panel may be a surface irradiated with the active energy rays. Since a UV blocking agent is generally included in a film disposed on a backlight unit, a light source, among the films used in the double-sided polarizing plate, the surface irradiated with the active energy rays may be a surface of the film not including the UV blocking agent. For example, in the case of the double-sided polarizing plate, the irradiated surface which does not include the UV rays blocking agent may be adhered to a liquid crystal panel.

The thickness of the adhesive layer attached to the surface not irradiated with the active energy rays may be in a range of approximately 0.1 μm to 3 μm. In the method of manufacturing a double-sided polarizing plate according to the related art, the adhesive layers are generally formed on both surfaces of the polarizer to have the same thickness. In this case, the adhesive layers have a thickness of approximately 5 μm to 10 μm. In this case, however, the adhesive layer not directly irradiated with light has a problem in that adhesive strength may be deteriorated. Therefore, the thickness of the adhesive layers formed on both surfaces of the polarizer, in detail, the thickness of the adhesive layer formed on the non-light irradiated surface thereof, may be in a range of 0.1 μm to 3 μm to secure relatively excellent adhesive strength thereon by performing irradiation of light once.

On the other hand, according to an exemplary embodiment of the present invention, peel strength of the adhesive layer formed on the transparent film in a direction in which the energy source is provided may be 3N or more at a peeling angle of 90°. In other words, when the peel strength of the adhesive is 3N or more, reworkability may be relatively excellent. In a case in which a polarizing plate is attached to a liquid crystal device or the like, an adhesive agent is generally used between a liquid crystal panel and a polarizing plate. In general, since such an adhesive agent has a peeling strength of 2N or more, or less than 3N, at a peeling angle of 90°, when the peel strength of the adhesive layer formed on the irradiated surface, a surface attached to a liquid crystal panel in the double-sided polarizing plate, is smaller than that of a layer of the adhesive agent, a problem in which a protective film attached to the polarizer remains on a liquid crystal panel surface may occur at the time of reworking. Therefore, in the method of manufacturing a double-sided polarizing plate according to an exemplary embodiment of the present invention, the double-sided polarizing plate may be manufactured such that the peel strength of the adhesive layer formed on a surface irradiated with the active energy rays has at least 3N or more, so as to significantly increase reworkability.

As described above, in the method of manufacturing a double-sided polarizing plate according to an exemplary embodiment of the present invention, including thermally treating the non-light irradiated surface at a temperature of 10° C. to 25° C., a difference in the peel strength of the adhesive layer formed on the non-light irradiated surface and the peel strength of the adhesive layer formed on a surface irradiated with the active energy rays may be less than or equal to 0.7 N, and in further detail, may be in a range of 0.005 N to 0.5 N. Therefore, a double-sided polarizing plate including the adhesive layers having excellent adhesive strength, on both surfaces of the polarizer, may be obtained.

Meanwhile, the method of manufacturing a double-sided polarizing plate according to an exemplary embodiment of the present invention may further include forming a primer layer between the adhesive layer and the transparent film.

The primer layer may serve to improve an adhesive strength between the transparent film and the adhesive layer. Thus, the primer layer may be formed using a primer composition including a urethane polymer. For example, the primer composition includes a urethane polymer, water-dispersible fine particles, and water. In further detail, the primer composition may include 1 part by weight to 50 parts by weight of the urethane polymer, 0.1 parts by weight to 10 parts by weight of the water-dispersible fine particles, and the remaining water.

The urethane polymer may be obtained by allowing polyisocyanate to react with polyol. Any proper polyols may be used as the polyol without particular limitations as long as two or more hydroxyl groups are contained in the molecule thereof. For example, examples of the polyol may include polyesterpolyol, polyether polyol, polycarbonate-diol, and the like. As at least one selected from the group consisting of these polyols, they may be used alone or in a combination of two or more thereof.

The polyol may be at least one selected from the group consisting of ethylene glycol, 1,2-propanonediol, 1,3-propanediol, 1,3-butanediol, 1,4-butanediol, neopentylglycol, pentanediol, 1,6-hexanediol, 1,8-octanediol, 1,10-decanediol, 4,4'-dihydroxyphenylpropane, 4,4'-dihydroxymethylmethane, diethylene glycol, triethylene glycol, polyethylene glycol, dipropyleneglycol, polypropyleneglycol, 1,4-cyclohexanedimethanol, 1,4-cyclohexanediol, bisphenol A, bisphenol F, glycerine, 1,1,1-trimethylolpropane, 1,2,5-hexatriol, pentaerythritol, glucose, sucrose, and sorbitol.

Meanwhile, the polyester polyol may be typically obtained by allowing a polyol component to react with a polybasic acid component. The polybasic acid component may, for example, include an aromatic dicarboxylic acid such as ortho-phthalic acid, isophthalic acid, terephthalic acid, 1,4-naphthalenedicarboxylic acid, 2,5-naphthalenedicarboxylic acid, 2,6-naphthalenedicarboxylic acid, biphenyldicarboxylic acid, tetrahydrophthalic acid, or the like; an aliphatic dicarboxylic acid such as oxalic acid, succinic acid, malonic acid, glutaric acid, adipic acid, pimelic acid, suberic acid, azelaic acid, sebacic acid, linoleic acid, maleic acid, fumaric acid, mesaconic acid, itaconic acid, or the like; an alicyclic dicarboxylic acid such as hexahydrophthalic acid, tetrahydrophthalic acid, 1,3-cyclohexanedicarboxylic acid, 1,4-cyclohexanedicarboxylic acid, or the like; or a reactive derivative thereof such as acid anhydride, alkyl ester, or acid halide thereof, or the like. They may be used alone or in a combination of two or more thereof. In further detail, the polybasic acid component may be at least one selected from the group consisting of polytetramethyleneglycol (PTMG), polypropyleneglycol (PPG), and polyethylene glycol (PEG).

The polycarbonate polyol may be at least one selected from the group consisting of poly(hexamethylene carbonate) glycol, and poly(cyclohexanecarbonate) glycol.

The polyether polyol may be typically obtained by adding alkylene oxide to polyhydric alcohol by ring opening polymerization. As the polyhydric alcohol, for example, ethylene glycol, diethylene glycol, propylene glycol, dipropylene glycol, glycerine, trimethylol propane, or the like, may be used, alone or as a combination of two or more thereof.

A compound having two or more NCO groups may be used as the isocyanate without particular limitation. Examples of the isocyanate may include respective ones to be used alone, or a combination of two or more selected from a group consisting of toluene diisocyanate (TDI), 4,4-diphenylmethane diisocyanate (MDI), 1,5-naphthalene diisocyanate (NDI), tolidine diisocyanate (TODI), hexamethylene diisocyanate (HMDI), isophorone diisocyanate (IPDI), p-phenylene diisocyanate, transcyclohexane, 1,4-diisocyanate, and xylene diisocyanate (XDI).

The urethane resin may be manufactured using a method commonly known in the art, appropriate therefor. In further detail, a single step method of allowing the respective components to react with each another at once, and a multi-step method of allowing the respective components to react with each another in stages. When the urethane resin contains a carboxyl group, the urethane resin may be prepared using the multistage method, such that the carboxyl group may be easily introduced to the urethane resin. Further, any urethane-reactive catalysts appropriate therefor may be used in manufacturing the urethane resin.

In the case of the manufacturing of the urethane resin, other polyols and/or other chain extenders may participate in a reaction in addition to the above-described components.

Examples of the other polyols may include, for example, polyols having three or more hydroxyl groups, such as sorbitol, glycerine, trimethylolethane, trimethylolpropane, pentaerythritol, and the like.

The other chain extenders may, for example, include glycols such as ethylene glycol, diethylene glycol, triethylene glycol, 1,3-propanediol, 1,3-butanediol, 1,4-butanediol, neopentyl glycol, pentanediol, 1,6-hexanediol, propyleneglycol, and the like; aliphatic diamines such as ethylenediamine, propylenediamine, hexamethylenediamine, 1,4-butanediamine, aminoethylethanolamine, and the like; alicyclic diamines such as isophoronediamine, 4,4'-dicyclohexylmethanediamine, and the like; aromatic diamines such as xylenediamine, tolylenediamine, and the like.

Further, a neutralizing agent may be used in the manufacturing of the urethane resin. When the neutralizing agent is used, stability of the urethane resin in water may be improved. For example, examples of the neutralizing agent may include ammonia N-methylmorpholine, triethylamine, dimethylethanolamine, methyldiethanolamine, triethanolalkyne, morpholine, tripropylamine, ethanolamine, triisopropanolamine, or the like, which may be used alone or as a combination of two or more thereof.

In the manufacturing of the urethane resin, an organic solvent inert to the polyisocyanate and compatible with water may be used. As the corresponding organic solvent, an ester-based solvent such as ethyl acetate, ethyl cellosolve acetate, or the like; a ketone-based solvent such as acetone, methyl ethyl ketone, methylisobutylketone, or the like; an ether-based solvent such as dioxane tetrahydrofuran, or the like, may be used alone or as a combination of two or more thereof.

On the other hand, the urethane polymer may include, in further detail, a carboxyl group. When the urethane polymer includes the carboxyl group, water dispersibility may be improved, leading to improvements in close adhesion between the adhesive layer and the transparent film.

The urethane polymer containing the carboxyl group may be obtained, for example, by adding polyol and polyisocyanate and allowing the polyol and the polyisocyanate to react with a chain extender containing a free carboxyl group. The chain extender containing a carboxyl group may include dihydroxycarboxylic acid, dihydroxysuccinic acid, or the like. The dihydroxycarboxylic acid may include, for example, dialkylol alkanoic acids including a dimethylol alkanoic acid such as dimethylol acetic acid, dimethylol butanoic acid, dimethylol propionic acid, dimethylol butyric acid, dimethylol pentanoic acid, or the like, which may be alone or as a combination of two or more thereof.

Meanwhile, the content of the urethane polymer may be in a range of approximately 1 part by weight to 50 parts by weight, in detail, approximately 3 parts by weight to 20 parts by weight, and in further detail, approximately 5 parts by weight to 15 parts by weight, based on 100 parts by weight of the primer composition. When the urethane polymer is included in a content of less than 1 part by weight, based on 100 parts by weight of the primer composition, adhesivity may be deteriorated. When the content of the urethane polymer exceeds 50 parts by weight, desired leveling may not be achieved due to an increase in viscosity during a coating process, resulting in an increase in drying time.

In addition, the urethane polymer may have a weight average molecular weight of 10,000 to 100,000. When the molecular weight of the urethane polymer is less than 10,000, adhesive strength may be deteriorated. When the molecular weight of the urethane polymer exceeds 100,000, difficulties in preparing water-dispersible urethane may be present.

Next, as the water-dispersible fine particles according to an exemplary embodiment of the present invention, any proper fine particles may be used. In detail, water-dispersible fine particles may be used to be appropriate therefor. In further detail, all types of inorganic fine particles and organic fine particles may be used. The inorganic fine particles may, for example, include inorganic oxides such as silica, titania, alumina, zirconia, antimony-based inorganic oxides, and the like. The organic fine particles may, for example, include a silicone-based resin, a fluorine-based resin, a (meth)acrylic resin, a cross-linked polyvinyl alcohol, a melamine-based resin, and the like.

Among the water-dispersible fine particles, silica may be used. Silica does not cause hazing and is not colored, since the silica has excellent blocking suppression capability for preventing the occurrence of a blocking phenomenon in which films adhere to each other, and also exhibits excellent transparency. Therefore, silica has a less influence on optical properties of the polarizing plate. Further, since silica exhibits good dispersibility and dispersion stability for the primer composition, workability may be improved at the time of forming the primer layer.

The water-dispersible fine particles may have an average diameter (i.e., an average primary particle diameter) of 10 nm to 200 nm, and in further detail, 20 nm to 70 nm. When the average diameter of the water-dispersible fine particles is less than 10 nm, condensation and precipitation of silica in a primer solution may occur due to an increase in surface energy, leading to a decrease in stability of the primer solution. When the average diameter of the water-dispersible fine particles is greater than 200 nm, silica may not be uniformly dispersed in the primer solution, and light having a wavelength of 400 nm or more is scattered due to an increase in visual wavelength range (400 nm to 800 nm) when the particles are aggregated, thereby causing an increase in haze. By using the fine particles within such a particle diameter range, unevenness appropriate therefor may be formed on a surface of the primer layer, thereby effectively reducing frictional force in a contact surface between the acrylic film and the primer layer and/or between the primer layers. As a result, the blocking suppression capability for preventing the occurrence of a blocking phenomenon in which films adhere to each other may be relatively excellent.

In addition, the content of the water-dispersible fine particles may be in a range of approximately 0.1 parts by weight to 10 parts by weight, based on 100 parts by weight of the primer composition. When the content of the water-dispersible fine particles is less than 0.1 parts by weight, films may be broken since the slipping between films does not occur during a winding process. When the content of the water-dispersible fine particles exceeds 10 parts by weight, hazing may occur.

Since the primer composition according to an exemplary embodiment of the present invention is soluble in water, the fine particles may be blended into an aqueous dispersion. In further detail, when silica is used to form the fine particles, the silica may be blended in the form of colloidal silica. Commercially available products themselves may be used as the colloidal silica. For example, Snowtex (Nissan Chemical Industries, Ltd.), AEROSIL (Air Products & Chemicals Inc.), Epostar and Soliostar RA (Nippon Shokubai), LSH (Ranco), and the like may be used.

The primer composition may further include a cross-linking agent, as necessary. A methylol compound such as oxazoline, boric acid, trimethylolmelamine, or the like, carbodiimide, isocyanate, or an aziridine compound may be used as the cross-linking agent.

Also, the cross-linking agent may be included in a content of 0.1 parts by weight to 30 parts by weight, based on 100 parts by weight of the primer composition. When the primer composition including the cross-linking agent is used, the primer layer serves to prevent penetration of water, and thus the primer composition exhibits superior optical properties such as water resistance and heat and humidity resistance.

Further, the primer composition may further include a silane coupling agent, a fluorine-based surfactant, a silane-based surfactant, and a surfactant containing an alkyl group, as other additives, as necessary.

The primer layer formed using such a primer composition may have a thickness of approximately 100 nm to 1 μm. When the thickness of the primer layer is equal to or less than 100 nm, adhesive strength may be deteriorated. When the thickness of the primer layer exceeds 1 μm, the primer layer may not be properly dried during a primer coating process, and thus films may be broken due to blocking between the films.

In addition, the water contact angle of a surface of the primer layer according to an exemplary embodiment of the present invention may be in a range of 40° to 100°, in detail, in a range of 50° to 90°, and in further detail, in a range of 60° to 80°. When the water contact angle is less than 40°, the primer layer may react with iodine in the polarizer due to relatively high degree of hydrophilicity to inhibit arrangement of iodine, resulting in distraction of prototype color phase and inhibition of polarization degree. When the water contact angle exceeds 100°, there may be present difficulties in terms of adhering the primer layer to the polarizer due to a high degree of hydrophobicity.

In the above-described method of manufacturing a double-sided polarizing plate according to an exemplary embodiment of the present invention, the formation of the primer layer may be performed using method commonly known in the art, but the present invention is not particularly limited. For example, the double-sided polarizing plate may be manufactured using a method including coating one surface of a transparent film with a primer composition to form a primer layer, coating one surface of the primer layer or polarizer with an adhesive composition to form an adhesive layer, laminating the polarizer and the transparent film, and curing the adhesive composition by irradiation with light. In this case, a method of coating the primer composition may be performed using a method such as a bar coating method, a gravure coating method, a slot-die coating method, or the like.

The double-sided polarizing plate of the present invention manufactured by the above-described method may be effectively used for optical devices such as liquid crystal display devices, and the like. For example, the optical device according to an exemplary embodiment of the present invention may be a liquid crystal display device including a liquid crystal panel and polarizing plates provided on both surfaces of the liquid crystal panel. In this case, at least one of the polarizing plates may be a polarizing plate according to an exemplary embodiment of the present invention. In this case, types of the liquid crystal panel included in the liquid crystal display device are not particularly limited. For example, all types of known panels, for example, a passive matrix panel such as a twisted nematic (TN) panel, a super-twisted nematic (STN) panel, a ferroelectric (F) panel, or a polymer-dispersed (PD) panel; an active matrix panel such as a two-terminal panel, or a three-terminal panel; an in-plane switching (IPS) panel, a vertical alignment (VA) panel, and the like, may be used, but the present invention is not limited thereto. Also, types of further components, for example, upper and lower substrates (i.e., a color filter substrate, or an array substrate), configuring the liquid crystal display device are not also particularly limited. For example, commonly known components may be used without particular limitation.

MODE FOR INVENTION

PREPARATIVE EXAMPLE 1

Preparation of Transparent Base Film

A resin composition in which a poly(N-cyclohexylmaleimide-co-methyl methacrylate) resin, a styrene-anhydrous maleic acid copolymeric resin and a phenoxy-based resin were uniformly mixed at a weight ratio of 100:2.5:5:5 and fed to a 24φ extruder in which a space spanning from a feed hopper to an extruder was replaced with nitrogen, and melted at 250° C. to prepare a feed pellet.

PKFE (Mw=60,000, Mn=16,000, Tg=95° C.; commercially available from InChemRez®) was used as the phenoxy-based resin, Dylaeck 332 including styrene at 85% by weight and anhydrous maleic acid at 15% by weight was used as the styrene-anhydrous maleic acid copolymeric resin, and the poly(N-cyclohexylmaleimide-co-methyl methacrylate) resin was analyzed through NMR. As a result, the content of N-cyclohexylmaleimide was 6.5% by weight.

The resulting feed pellet was dried under a vacuum, melted at 260° C. in an extruder, and passed through a coat hanger-type T-die, followed by a chromium-plated casting roll and a drying roll, thereby manufacturing a film having a thickness of 150 μm. The film was elongated at 125° C. in an MD direction using Pilot Elongation equipment to manufacture an acrylic film. In this case, the film was elongated at a percentage of 170% using a difference in roll speeds.

The acrylic film manufactured thereby was treated with corona, and one surface of the acrylic film was coated with a primer composition, in which 20 parts by weight of an oxazoline cross-linking agent (WS700, commercially available from Nippon Shokubai) was added to a primer composition having a solid content of 10% by weight prepared by diluting CK-PUD-F (a urethane dispersion commercially available from Chokwang Paint Ltd.) with pure water, using a #5 bar, and elongated at 130° C. in a TD direction to a percentage of 190% using a tender to manufacture an acrylic film including a primer layer having a thickness of 400 nm.

PREPARATIVE EXAMPLE 2

Preparation of Adhesive Composition (1) Adhesive Composition A 5 parts by weight of a cationic initiator, CPI 100P (commercially available from Sanapro), and 5 parts by weight of vinyltriethylsilane, were added to 100 parts by weight of a resin composition prepared by adding 25% by weight of 3,4-epoxycyclohexylmethyl-3,4'-epoxycyclohexanecarboxylate (Celloxide 2021P commercially available from Dicel), 25% by weight of 1,4-cyclohexane dimethanol diglycidyl ether, and 50% by weight of 3-ethyl-3-[(3-ethyloxetan-3-yl)methoxymethyl]oxetane (Toa Gosei Aaron Oxetane DOX221), to prepare an adhesive composition A for a polarizing plate.

(2) Adhesive Composition B 5 parts by weight of a cationic initiator, CPI 100P (commercially available from Sanapro), was added to 100 parts by weight of a resin composition prepared by adding 25% by weight of 3,4-epoxycyclohexylmethyl-3,4'-epoxycyclohexanecarboxylate (Celloxide 2021P commercially available from Dicel), 25% by weight of 1,4-cyclohexane dimethanol diglycidyl ether, 35% by weight of 3-ethyl-3-[(3-ethyloxetan-3-yl)methoxymethyl]oxetane (Toa Gosei Aaron Oxetane DOX221), and 15% by weight of 3-ethyl-3-hydroxymethyloxetane (Toa Gosei Aaron Oxetane OXA), to prepare an adhesive composition B for a polarizing plate.

(3) Adhesive Composition C 5 parts by weight of a cationic initiator, CPI 100P (commercially available from Sanapro), and 5 parts by weight of vinyl acetate were added to 100 parts by weight of a resin composition prepared by adding 25% by weight of 3,4-epoxycyclohexylmethyl-3,4'-epoxycyclohexanecarboxylate (Celloxide 2021P commercially available from Dicel), 25% by weight of 1,4-cyclohexane dimethanol diglycidyl ether, and 50% by weight of 3-ethyl-3-[(3-ethyloxetan-3-yl) methoxymethyl]oxetane (Toa Gosei Aaron oxetane DOX221) to prepare an adhesive composition C for a polarizing plate.

EXAMPLE 1

Primer layers of the two acrylic films prepared in Preparative Example 1 were coated with an adhesive composition A, using a microgravure coater, so that the final thickness of each of adhesive layers amounted to 1 μm. Thereafter, the two acrylic films coated with the adhesive composition were laminated on both surfaces of a PVA element. Then, one surface of the PVA element was unidirectionally irradiated with UV rays with an amount of light of 200 mJ/cm$^2$ using a UV irradiation system (a fusion lamp, D bulb), and a surface of the acrylic film disposed opposite to the UV irradiation system was closely adhered to a drum at the same time. The temperature of the drum was adjusted to 20° C. to manufacture a polarizing plate.

EXAMPLE 2

A polarizing plate was manufactured in the same manner as in Example 1, except that the adhesive composition B was used as the adhesive composition.

EXAMPLE 3

A polarizing plate was manufactured in the same manner as in Example 1, except that the adhesive composition C was used as the adhesive composition.

EXAMPLE 4

A polarizing plate was manufactured in the same manner as in Example 2, except that one surface of a PVA element was unidirectionally irradiated with UV rays with an amount of light of 400 mJ/cm$^2$ using a UV irradiation system.

EXAMPLE 5

A polarizing plate was manufactured in the same manner as in Example 2, except that the temperature of the drum was adjusted to 25° C.

EXAMPLE 6

A polarizing plate was manufactured in the same manner as in Example 2, except that one surface of a PVA element was unidirectionally irradiated with UV rays with an amount of light of 1000 mJ/cm$^2$ using a UV irradiation system, and the temperature of the drum was adjusted to 15° C. at the same time.

COMPARATIVE EXAMPLE 1

A polarizing plate was manufactured in the same manner as in Example 2, except that one surface of a PVA element was unidirectionally irradiated with UV rays with an amount of light of 100 mJ/cm$^2$ using a UV irradiation system.

COMPARATIVE EXAMPLE 2

A polarizing plate was manufactured in the same manner as in Example 2, except that the adhesive composition B was used as the adhesive composition and the temperature of the drum was set to 5° C.

COMPARATIVE EXAMPLE 3

A polarizing plate was manufactured in the same manner as in Example 2, except that the adhesive composition B was used as the adhesive composition and the temperature of the drum was set to 30° C.

EXPERIMENTAL EXAMPLE 1

Measurement of Peel Strength of Polarizing Plates

With respect to the polarizing plates manufactured through Examples 1 to 6 and Comparative Examples 1 to 3, adhesive strengths of the adhesive layers formed on the surface directly irradiated with the active energy rays were measured. The peel strength of a polarizing plate having a width of 20 mm and a length of 100 mm was measured by peeling a surface of the acrylic film, which was not irradiated with UV rays, from a PVA element at a rate of 300 mm/min and an angle of 90°. The results are listed in the following Table 2.

EXPERIMENTAL EXAMPLE 2

Evaluation of Reworkability of Polarizing Plates

Reworkability with regard to the polarizing plates manufactured through Examples 1 to 6 and Comparative Examples 1 to 3 was evaluated through the following method. First, a coated cohesive film was laminated with a polarizing plate and then laminated with an LCD substrate to have the size of 20 cm×20 cm. The attached sample was kept in an autoclave (at 50° C. and a pressure of 0.5) for 20 minutes and kept in the laboratory at 25° C. and 50% RH for 24 hours. Then, the sample after the storage thereof was peeled at an angle of 90° and it was evaluated whether an cohesive agent remained on the LCD substrate. The results thereof are provided in Table 2. The case that the peeling was carried out to be clean without a residual cohesive agent on the LCD substrate while preventing the acrylic film from being peeled from the polarizing plate is represented as OK in Table 2 and the case that the acrylic film was peeled from the polarizing plate to remain on the LCD substrate is represented as NG in Table 2.

EXPERIMENTAL EXAMPLE 3

Evaluation of External Appearance of Polarizing Plates

The appearance of each of the polarizing plates manufactured in Examples 1 to 6 and Comparative Examples 1 to 3 was observed with the naked eye to determine whether wrinkles occurred, whether bubbles occurred, and whether waterdrops occurred. The results are listed in the following Table 2. The cases in which there were no wrinkles and bubbles are represented by 'OK', and the cases in which there were wrinkles, bubbles and waterdrops are represented by 'NG'.

TABLE 1

| Classification | Irradiation of UV, Amount of Light [mJ/cm²] | Processing Temperature of Non-Light-Irradiated Surface [° C.] | Adhesive | Thickness of Adhesive Layer [μm] |
|---|---|---|---|---|
| Example 1 | 200 | 20 | A | 1 |
| Example 2 | 200 | 20 | B | 1 |
| Example 3 | 200 | 20 | C | 1 |
| Example 4 | 400 | 20 | B | 1 |
| Example 5 | 200 | 25 | B | 1 |
| Example 6 | 1000 | 15 | B | 1 |
| Comparative Example 1 | 100 | 20 | B | 1 |
| Comparative Example 2 | 200 | 5 | B | 1 |
| Comparative Example 3 | 200 | 30 | B | 1 |

TABLE 2

| Classification | Measurement of Peel Strength on Light-Irradiated Surface | Evaluation of Reworkability | Evaluation of Appearance of Polarizing Plate |
|---|---|---|---|
| Example 1 | 3N | OK | OK |
| Example 2 | 3N | OK | OK |
| Example 3 | 3N | OK | OK |
| Example 4 | 3.5N | OK | OK |
| Example 5 | 3.5N | OK | OK |
| Example 6 | 3N | OK | OK |
| Comparative Example 1 | 0.5N | NG | OK |
| Comparative Example 2 | 1N | NG | NG |
| Comparative Example 3 | 3.5N | OK | NG |

As illustrated in Table 2, it can be appreciated that in the case of Examples 1 to 6 according to the exemplary embodiments of the present invention, since the surface irradiated with active energy rays has peel strength of 3N or more, adhesive strength may be relatively excellent and reworkability may also be good, and further, external appearance characteristics of the polarizing plate may be excellent.

Meanwhile, in the case of Comparative Example 1, the peel strength on the light-irradiated surface was relatively low, the adhesive strength and reworkability thereof were deteriorated. In the case of Comparative Example 2, the adhesive strength and reworkability were not good and the phenomenon in which waterdrops were generated on the polarizing film occurred, such that the appearance of the polarizing plate was not good. In the case of Comparative Example 3, while the reworkability was good, wrinkles occurred on the polarizing plate, such that a problem in which the appearance thereof was not good was present.

While the present invention has been shown and described in connection with the embodiments, it will be apparent to those skilled in the art that modifications and variations may be made without departing from the spirit and scope of the present invention as defined by the appended claims.

The invention claimed is:

1. A method of manufacturing a double-sided polarizing plate, comprising:
attaching transparent films to both surfaces of a polarizer via adhesive layers;
irradiating the adhesive layers with active energy rays in an amount of light of 200 mJ/cm² or more through an energy source located in a single direction, based on the polarizer; and
thermally treating a surface of the transparent film disposed to oppose the energy source at a temperature of 10° C. to 25° C.,
wherein the adhesive layers are formed using a cationic adhesive,
wherein the cationic adhesive includes (1) 5 to 90 parts by weight of an epoxy compound having at least two epoxy groups in a molecule; (2) 5 to 90 parts by weight of an oxetane compound having at least one oxetanyl group in the molecule; and (3) 0.5 to 20 parts by weight of an optical cationic photopolymerization initiator, based on total of 100 parts by weight of an adhesive composition,
wherein the epoxy compound is a combination of a first epoxy compound containing one or more epoxidized alicyclic groups and a second epoxy compound containing one or more glycidyl ether groups, and
the first epoxy compound and the second epoxy compound are mixed at a weight ratio of 1:1 to 3:1,
wherein peel strength of the adhesive layer formed on the transparent film at which the energy source is located is equal to or greater than 3N at a peel angle of 90°,
wherein a difference in peel strengths of respective adhesive layers formed on both surfaces of the polarizer is equal to or less than 0.7 N
wherein the first epoxy compound is at least one selected from the group consisting of 3,4-epoxycyclohexylmethyl-3,4'-epoxycyclohexanecarboxylate, and vinylcyclohexenedioxide,
wherein the second epoxy compound is at least one selected from the group consisting of 1,4-cyclohexanedimethanol diglycidyl ether, 1,4-butanediol diglycidyl ether, neopentyl diglycidyl ether and trimethylolpropane triglycidyl ether, and
wherein the adhesive composition used to form adhesive layers has a viscosity of 15 cP to 50 cP.

2. The method of claim 1, wherein the irradiating of the active energy rays and the thermally treating at 10° C. to 25° C. are performed simultaneously with each other.

3. The method of claim 1, wherein the thermally treating at 10° C. to 25° C. is performed using a drum.

4. The method of claim 1, further comprising simultaneously curing the adhesive layers formed on both surfaces of the polarizer by performing a single irradiation of the active energy rays.

5. The method of claim 1, wherein the adhesive layer formed on the transparent film at which the energy source is disposed has a thickness of from 0.1 μm to 10 μm.

6. The method of claim 1, wherein the adhesive layer formed on a surface of the transparent film opposite to a position of the transparent film in which the energy source is located, has a thickness of from 0.1 μm to 3 μm.

7. The method of claim 1, wherein the cationic adhesive further comprises one or more selected from a group consisting of a silane coupling agent, a vinyl-based compound, and a radical polymerizable monomer.

8. The method of claim 1, further comprising forming a primer layer between at least one surface of the adhesive layer and at least one surface of the transparent film.

9. The method of claim 8, wherein the primer layer is formed using a primer composition containing 1 to 50 parts by weight of a urethane polymer, 0.1 to 10 parts by weight of water-dispersible fine particles, and the balance of water, based on a total of 100 parts by weight of the primer composition.

10. The method of claim 9, wherein the primer composition further comprises a cross-linking agent.

11. The method of claim 8, wherein the primer layer has a thickness of from 100 nm to 1 μm.

12. The method of claim 1, wherein at least one of the transparent films formed on both surfaces of the polarizer is an acrylic film.

13. A double-sided polarizing plate manufactured using the method of claim 1.

* * * * *